United States Patent [19]

Kashiwa et al.

[11] Patent Number: 5,075,396

[45] Date of Patent: Dec. 24, 1991

[54] PROCESS AND CATALYST COMPOSITION FOR PRODUCING OLEFIN POLYMERS

[75] Inventors: Norio Kashiwa; Akinori Toyota, both of Iwakuni; Mamoru Kioka, Ohtake, all of Japan

[73] Assignee: Mitsui Petrochemical Industries, Ltd., Tokyo, Japan

[21] Appl. No.: 331,221

[22] Filed: Mar. 31, 1989

Related U.S. Application Data

[60] Division of Ser. No. 99,797, Sep. 22, 1987, Pat. No. 4,841,003, which is a division of Ser. No. 783,816, Oct. 7, 1985, Pat. No. 4,725,656, which is a continuation of Ser. No. 563,824, Dec. 21, 1983, abandoned.

[30] Foreign Application Priority Data

Dec. 24, 1982 [JP] Japan .............................. 57-225999

[51] Int. Cl.$^5$ ........................... C08F 4/50; C08F 10/00
[52] U.S. Cl. ..................................... 526/125; 526/128; 526/140; 526/141; 526/142; 502/116; 502/122; 502/124; 502/127
[58] Field of Search ............... 526/125, 128, 142, 140, 526/141; 502/116, 122, 124, 127

[56] References Cited

U.S. PATENT DOCUMENTS 4,442,276  4/1984  Kashiwa et al. .................. 526/125

FOREIGN PATENT DOCUMENTS 0045976  2/1982  European Pat. Off. ............ 526/125
0045977  2/1982  European Pat. Off. ............ 526/125

*Primary Examiner*—Fred Teskin
*Attorney, Agent, or Firm*—Sherman and Shalloway

[57] ABSTRACT

A process for producing a polymer or copolymer of an olefin which comprises polymerizing or copolymerizing at least one olefin with or without a diolefin in the presence of a catalyst composed of (A) a magnesium-containing solid titanium catalyst component containing magnesium, titanium, a halogen and an electron donor as essential ingredients and (B) an organoaluminum compound catalyst component; characterized in that (1) said catalyst further comprises (C) an organic silicon compound catalyst component having an Si—O—C or Si—N—C bond, and
(2) said electron donor in the catalyst component (A) is a cyclic mono- or poly-ester such as diethyl furane-3,4-dicarboxylate, di-n-butyl 3,4-dihydro-2H-pyrane-5,6-dicarboxylate, di-isobutyl pyrrole-2,3-dicarboxylic, di-n-butyl thiophene-2,3-dicarboxylate, n-octyl pyrrolidine-2,3-dicarboxylate, and so on.

15 Claims, No Drawings

PROCESS AND CATALYST COMPOSITION FOR PRODUCING OLEFIN POLYMERS

This is a division of application Ser. No. 07/099,797, filed Sept. 22, 1987 now U.S. Pat. No. 4,841,003, which in turn is a division of application Ser. No. 06/783,816, filed Oct. 7, 1985, now U.S. Pat. No. 4,725,656, which in turn is a continuation of application Ser. No. 06/563,824, filed Dec. 21, 1983, now abandoned.

This invention relates to a process for producing a polymer or copolymer of an olefin which comprises polymerizing or copolymerizing at least one olefin with or without a diolefin, preferably polymerizing or copolymerizing at least one olefin containing at least 3 carbon atoms, or copolymerizing the olefin with up to 10 mole % of ethylene and/or a diolefin, in the presence of a catalyst composed of (A) a magnesium-containing solid titanium catalyst component containing magnesium, titanium, a halogen and an electron donor as essential ingredients and (B) an organoaluminum compound catalyst component.

According to the process of this invention, the duration of the catalytic activity is excellent, and the polymerization activity or stereospecificity shows superiority. Furthermore, even when the process is applied to the preparation of an olefin polymer or copolymer having a high melt index by using a molecular weight controlling agent such as hydrogen, the stereospecificity of the resulting polymer or copolymer does not show an appreciable decrease.

Many proposals have been known heretofore about the polymerization or copolymerization of olefins using a catalyst composed of (A) a magnesium-containing solid titanium catalyst component containing magnesium, titanium, a halogen and an electron donor as essential ingredients and (B) an organoaluminum compound catalyst component. It is generally known that highly stereospecific polymers or copolymers can be produced with high catalytic activity by polymerizing or copolymerizing alpha-olefins having at least 3 carbon atoms using catalysts of this type. Many prior attempts have been made to produce the magnesium-containing solid titanium catalyst component (A) by using a variety of reactants, their combinations and means for preparing this catalyst component.

It is still desired, however, to improve the activity of the catalyst and the stereospecificity of the resulting polymers or copolymers. For example, to obtain olefin polymers or copolymers having high quality without the need for an after-treatment operation after the polymerization, the proportion of a stereospecific polymer or copolymer should be very high, and the yield of the polymer or copolymer per unit weight of the transition metal should be sufficiently high. The conventional techniques proposed can be said to be on a fairly high level with some types of the final polymers or copolymers. However, few can be said to exhibit sufficient performance in view of the amount of halogen remaining in the final polymers or copolymers which causes the disadvantage of rust formation on molding machines.

Furthermore, the conventional techniques usually have the defect that not a low decrease occurs in yield and stereospecificity in the production of polymers having a high melt index.

The present inventors have made investigations in order to provide an improved process for polymerization or copolymerization of olefins which can overcome the aforesaid disadvantages or defects. These investigations have led to the discovery that a process for polymerizing or copolymerizing olefins with an excellent duration of the catalytic activity and higher polymerization activity or stereospecificity can be provided by using a catalyst composed of (A) a magnesium-containing solid titanium catalyst component containing magnesium, titanium, a halogen and an electron donor as essential ingredients, (B) an organoaluminum compound catalyst component and (C) an organic silicon compound catalyst component having an Si—O—C or Si—N—C bond, said electron donor forming the magnesium-containing solid titanium catalyst component (A) being selected from compounds (a), (b), (c), (d), (e) and (f) described hereinbelow.

It has also been found that when polymers of high melt indices are to be produced by using the conventional catalyst systems by increasing the amount of a molecular weight controlling agent such as hydrogen, a reduction in catalytic activity cannot be avoided, but that the catalyst system of this invention does not show such a reduction in activity but unexpectedly rather tends to increase in activity.

It is an object of this invention therefore to provide an improved process for polymerizing or copolymerizing olefins, preferably alpha-olefins having at least 3 carbon atoms.

Another object of this invention is to provide an improved catalyst to be used in the aforesaid improved process.

The above and other objects and advantages of this invention will become apparent from the following description.

According to this invention, there is used a catalyst composed of (A) a magnesium-containing solid titanium catalyst component containing magnesium, titanium, a halogen and an electron donor as essential ingredients, (B) an organoaluminum compound catalyst component and (C) an organic silicon compound catalyst component having an Si—O—C or Si—N—C bond, the electron donor in component (A) being selected from the group consisting of compounds (a), (b), (c), (d), (e) and (f) described below.

(a) A mono- or poly-ester of an unsaturated non-aromatic cyclic polycarboxylic acid in which $R^1$ of the ester moiety —COOR$^1$ is a linear hydrocarbon group, and the non-aromatic ring is a non-heterocyclic ring composed of at least one pair of 2 adjacent carbon atoms forming a double bond and another carbon atom with at least two carboxyl groups being directly or indirectly bonded to the carbon atoms forming the double bond.

Preferred esters (a) are those of the following formula

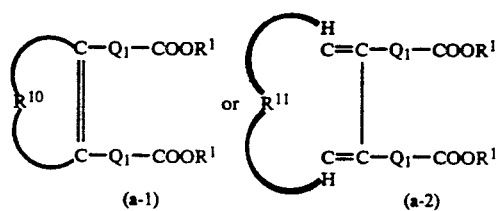

(a-1)    (a-2)

wherein $R^{10}$ represents a substituted or unsubstituted divalent hydrocarbon group having 1 to 8 carbon atoms, preferably 3 to 5 carbon atoms, more preferably 4 carbon atoms, $R^{11}$ represents a substituted or unsubstituted alkylene group having 1 to 4 carbon atoms, preferably 1 to 3 carbon atoms, more preferably 2 carbon atoms, $Q_1$'s may be identical or different and each represents a direct single bond, or a substituted or unsubstituted divalent hydrocarbon group having 1 to 6 carbon atoms, preferably 1 to 2 carbon atoms, which may have a double bond, $Q_1$'s should not simultaneously contain a double bond, and $R^1$'s may be identical or different and each represents a linear alkyl group having 1 to 16 carbon atoms, preferably 2 to 8 carbon atoms.

Examples of the divalent hydrocarbon group $R^{10}$ include methylene, ethylene, trimethylene, tetramethylene, hexamethylene, propenylene, butenylene and hexadienylene groups.

Examples of the substituent which the divalent hydrocarbon group $R^{10}$ may have are $C_1$-$C_6$ alkyl groups, $C_6$-$C_{12}$ cycloalkyl groups, $C_6$-$C_{12}$ aryl groups, $C_2$-$C_6$ alkenyl groups, $C_1$-$C_6$ haloalkyl groups and $C_1$-$C_6$ aminoalkyl groups.

Examples of the substituent which $R^{11}$ may have include are the same as those given above for $R^{10}$.

Examples of the divalent hydrocarbon group $Q_1$ include methylene, ethylene, trimethylene and propylene groups.

Examples of $R^1$ include ethyl, propyl, n-butyl and hexyl groups.

Examples of the esters of formula (a-1) or (a-2) above include diethyl cyclohexene-1,2-dicarboxylate, di-n-propyl cyclohexene-1,2-dicarboxylate, di-n-butyl cyclohexene-1,2-dicarboxylate, di-n-hexyl cyclohexene-1,2-dicarboxylate, di-n-octyl cyclohexene-1,2-dicarboxylate, mono-n-butyl cyclohexene-1,2-dicarboxylate, di-n-butyl 1,3-cyclohexadiene-1,2-dicarboxylate, di-n-octyl 1,4-cyclohexadiene-1,2-dicarboxylate, di-n-butyl cyclohexene-1,2-diacetate, di-n-butyl 1,4-cyclohexadiene-1,2-diacetate and di-n-butyl 1,3-cyclohexadiene-2,3-dicarboxylate.

(b) A mono- or poly-ester of an unsaturated heterocyclic polycarboxylic acid in which $R^2$ of the ester moiety —$COOR^2$ is a linear hydrocarbon group, at least one $R^2$ is a linear hydrocarbon group having not less than 2 carbon atoms, the heterocyclic ring is an unsaturated heterocyclic ring composed of at least one pair of two adjacent carbon atoms forming a double bond and an oxygen atom alone as a hetero atom with at least two carboxyl groups being directly or indirectly bonded to the carbon atoms forming the double bond.

Preferred esters of (b) are those represented by the following formula

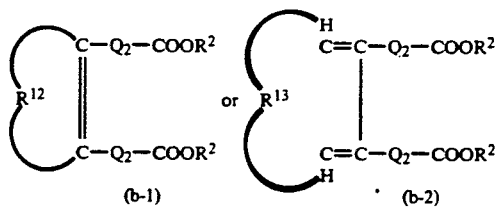

(b-1)      (b-2)

wherein $R^{12}$ represents a substituted or unsubstituted $C_1$-$C_5$, preferably $C_2$-$C_3$, more preferably $C_2$, divalent hydrocarbon group having at least one oxygen atom alone as a hetero atom which may have a double bond, $R^{13}$ represents —O— or a substituted or unsubstituted group of the formula $+O.CH_2+$, $Q_2$'s may be identical or different and each represents a direct single bond or a substituted or unsubstituted divalent hydrocarbon group having 1 to 6 carbon atoms which may have a double bond, $Q_2$'s should not simultaneously contain a double bond, and $R^2$'s may be identical or different and each represents a linear alkyl group having 1 to 16 carbon atoms, provided that at least one of the two $R^2$'s in each formula is a linear alkyl group having not less than 2 carbon atoms.

Examples of the divalent hydrocarbon group $R^{12}$ having at least one oxygen atom alone as a hetero atom include —$CH_2$—O—, —$CH_2$—O—$CH_2$—, —O—$CH_2$—$CH_2$—, —O—CH=CH—, —$CH_2$—CH$_2$—O—$CH_2$— and —CH=CH—O—$CH_2$—. Examples of the substituent which the divalent hydrocarbon group $R^{12}$ having at least one oxygen atom may have are $C_1$-$C_6$ alkyl groups, $C_6$-$C_{12}$ cycloalkyl groups, $C_6$-$C_{12}$ aryl groups, $C_2$-$C_6$ alkenyl groups, $C_1$-$C_6$ haloalkyl groups and $C_1$-$C_6$ aminoalkyl groups.

Examples of the substituent which the group $+O.CH_2+$ represented by $R^{13}$ have are the same as those given above for $R^{10}$.

Examples of the divalent hydrocarbon group $Q_2$ are methylene, ethylene, trimethylene and propylene groups.

Thus, specific examples of the esters of formula (b-1) or (b-2) include diethyl furane-3,4-dicarboxylate, di-n-propyl furane-3,4-dicarboxylate, di-n-butyl furane-3,4-dicarboxylate, di-n-octyl furane-3,4-dicarboxylate, di-n-butyl furane-2,3-dicarboxylate, di-n-octyl 4,5-dihydrofurane-2,3-dicarboxylate, di-n-butyl 3,4-dihydro-2H-pyrane-5,6-dicarboxylate and di-n-propyl benzopyrane-3,4-dicarboxylate.

(c) A mono- or poly-ester of an unsaturated heterocyclic polycarboxylic acid in which $R^3$ of the ester moiety —$COOR^3$ is a hydrocarbon group and at least one $R^3$ is a hydrocarbon group having not less than 3 carbon atoms, the heterocyclic ring is an unsaturated heterocyclic ring composed of at least one pair of two adjacent carbon atoms forming a double bond and at least one hetero atom selected from nitrogen and sulfur atoms, with at least two carboxyl groups being directly or indirectly bonded to the carbon atoms forming the double bond.

Preferred esters of (c) are those of the following formula

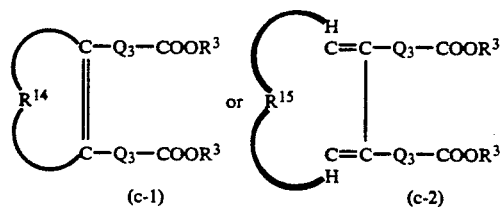

(c-1)      (c-2)

wherein $R^{14}$ represents a substituted or unsubstituted $C_1$-$C_6$, preferably $C_2$-$C_3$, divalent hydrocarbon group which has at least one hetero atom selected from the group consisting of nitrogen and sulfur atoms and which may have a double bond, $R^{15}$ represents a divalent group which has at least one hetero atom selected from nitrogen and sulfur atoms and is selected from the group consisting of —S—, —S—$CH_2$—, —NH— and —NH—$CH_2$—, $Q_3$'s may be identical or different and each represents a direct single bond, or a substituted or unsubstituted $C_1$-$C_6$ divalent hydrocarbon group which may have a double bond, $Q_3$'s should not simultaneously contain a double bond, $R_3$'s may be identical or different and each represents a linear or branched alkyl group having 1 to 16 carbon atoms, preferably 2 to 8 carbon atoms, and at least one of the two $R^3$ in each formula is a linear or branched alkyl group having not less than 3 carbon atoms.

Examples of the divalent hydrocarbon group $R^{14}$ having at least one hetero atom selected from nitrogen and sulfur atoms include $-NH-CH_2-$, $-NH-CH=CH-$, $-CH_2-NH-CH_2-$, $-NH-CH-CH_2-NH-CH_2-CH_2-$, $-S-CH_2-$, $-S-CH=CH-$, $-CH_2-S-CH_2-$, $-S-CH_2-CH_2-$, and $-CH_2-S-CH_2-CH_2-$.

Examples of the substituent which the divalent hydrocarbon group $R^{14}$ may have are the same as those given above for $R^{10}$.

Examples of the substituent which the divalent group $R^{15}$ having at least one hetero atom may have are the same as those given above for $R^{10}$.

Examples of the divalent hydrocarbon group $Q_3$ are the same as those given above for $Q_1$.

Specific examples of the esters of formula (c-1) or (c-2) include di-iso-butyl pyrrole-2,3-dicarboxylate, di-n-propyl pyrrole-2,3-dicarboxylate, di-isobutyl pyridine-2,3-dicarboxylate, di-n-hexyl pyridine-3,4-dicarboxylate, di-n-butyl thiophene-2,3-dicarboxylate, di-iso-octyl thiophene-3,4-dicarboxylate, di-n-butyl thionaphthene-2,3-dicarboxylate and di-n-propyl indole-2,3-dicarboxylate.

(d) A mono- or poly-ester of an unsaturated nonaromatic cyclic polycarboxylic acid in which $R^4$ of the ester moiety $-COOR^4$ is a hydrocarbon group, the non-aromatic ring may contain at least one hetero atom selected from oxygen, nitrogen and sulfur atoms in addition to at least two carbon atoms, and at least two carboxyl groups are bonded directly or indirectly to the non-aromatic ring, provided that when at least one pair of two adjacent carbon atoms forming a double bond exists in the non-aromatic ring, at least one of the carboxyl groups is bonded directly or indirectly to a carbon atom other than the above two adjacent carbon atoms.

Preferred esters of (d) are those of the following formula

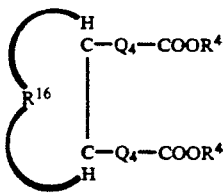

wherein $R^{16}$ represents a substituted or unsubstituted $C_2$-$C_{10}$ divalent hydrocarbon group which has a double bond and may contain at least one hetero atom selected from the group consisting of oxygen, nitrogen and sulfur atoms $Q_4$'s may be identical or different and each represents a direct single bond, or a substituted or unsubstituted divalent hydrocarbon group having 1 to 16 carbon atoms, preferably 1 to 2 cabon atoms, which may have a double bond, $Q_4'$ should not simultaneously contain a double bond, and $R^{4}$'s may be identical or different and each represents a linear or branched alkyl group having 1 to 16 carbon atoms, preferably 2 to 8 carbon atoms, provided that when $R^{16}$ has two adjacent carbon atoms forming a double bond, at least one group $-Q_4-COOR^4$ is bonded to a carbon atom other than the two adjacent carbon atoms.

Examples of the divalent or trivalent hydrocarbon group $R^{16}$ which may contain at least one hetero atom selected from the group consisting of oxygen, nitrogen and sulfur atoms include

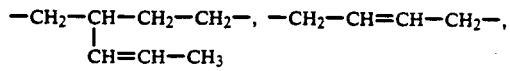
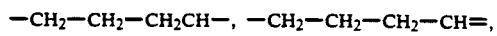
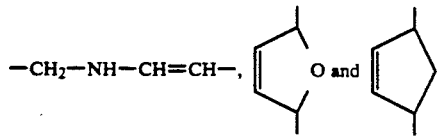

Examples of the substituent which the divalent or trivalent hydrocarbon group $R^{16}$ may have are the same as those given above for $R^{10}$.

Examples of the divalent hydrocarbon group $Q_4$ are the same groups as exemplified hereinabove for $Q_1$.

Specific examples of the esters of (d) include diethyl esters, di-iso-propyl esters, di-n-propyl esters, di-n-butyl esters, di-iso-butyl esters, di-secbutyl esters, di-tert-butyl esters, di-n-hexyl esters, di-n-octyl esters, di-2-ethylhexyl esters, di-n-decyl esters and mono-iso-butyl esters of dicarboxylic acids such as cyclohexene-1,6-dicarboxylic acid, cyclohexene-3,4-dicarboxylic acid, cyclohexene-4,5-dicarboxylic Nadic acid, Methyl Nadic acid, 1-allylcyclohexane-3,4-dicarboxylic acid, 2-pyrroline-4,5-dicarboxylic acid and 4,5-dihydrofurane-4,5-dicarboxylic acid.

As exemplified above, $R^4$ is preferably a linear or branched alkyl group having at least 2 carbon atoms.

(e) A mono- or poly-ester of an aromatic polycarboxylic acid in which $R^5$ of the ester moiety $-COOR^5$ is a hydrocarbon group and one carboxyl group is bonded to each of two adjacent carbon atoms of the aromatic ring provided that at least one of the carboxyl groups is bonded indirectly; or a mono- or poly-ester of a polycyclic aromatic polycarboxylic acid having a fused non-aromatic ring containing as constituent members two adjacent carbon atoms of the aromatic ring, in which $R^5$ of the ester moiety $-COOR^5$ is a hydrocarbon group and a carboxyl group is bonded directly or indirectly to each of two adjacent carbon atoms other than said members of the non-aromatic ring.

Preferred esters of (e) are those of the following formula

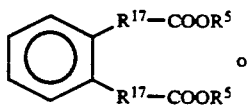

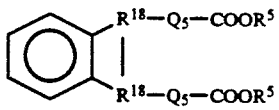

wherein $R^{17}$'s may be identical or different and each represents a single bond, or a substituted or unsubstituted $C_1$-$C_6$, preferably $C_1$-$C_2$, divalent hydrocarbon group which may have a double bond and may contain at least one hetero atom selected from the group consisting of oxygen, nitrogen and sulfur atoms, $R^{17}$'s should not simultaneously be single bonds, $R^{18}$'s may be identical or different and each represents a substituted or unsubstituted $C_1$-$C_2$ trivalent or tetravalent hydrocarbon group which may have a double bond and may contain at least one hetero atom selected from the group consisting of oxygen, nitrogen and sulfur atoms, $Q_5$'s may be identical or different and each represents a direct single bond or a divalent hydrocarbon group having 1 to 3 carbon atoms, and $R^5$'s may be identical or different and each represents a linear or branched alkyl group having 1 to 16 carbon atoms, preferably 2 to 8 carbon atoms.

Examples of the divalent hydrocarbon group $R^{17}$ which may contain at least one hetero atom selected from the group consisting of oxygen, nitrogen and sulfur atoms include methylene, ethylene and propylene groups.

Examples of the trivalent or tetravalent hydrocarbon group $R^{18}$ which may contain at least one hetero atom selected from the group consisting of oxygen, nitrogen and sulfur atoms include

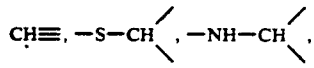

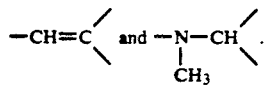

Examples of the divalent hydrocarbon group $Q_5$ are methylene, ethylene and propylene groups.

Specific examples of the esters of formula (e-1) or (e-2) include di-n-propyl 1,2-benzenediacetate, di-tert-butyl 1,2-benzenediacetate, diethyl 2,3-naphthalenediacetate, di-2-ethylhexyl indane-2,3-di-carboxylate, di-n-butyl 2,3-dihydrothionaphthene-2,3-dicarboxylate, and di-n-propyl 2,3-dihydroindole-2,3-dicarboxylate.

(f) A mono- or poly-ester of a saturated heterocyclic polycarboxylic acid in which $R^6$ of the ester moiety —COOR$^6$ is a hydrocarbon group, and the saturated heterocyclic ring is a saturated heterocylic ring composed of at least two adjacent carbon atoms and at least one hetero atom selected from the group consisting of oxygen, nitrogen and sulfur atoms with at least two carboxyl groups being bonded directly or indirectly to two adjacent carbon atoms of the heterocyclic ring.

Preferred esters of (f) are those of the following formula

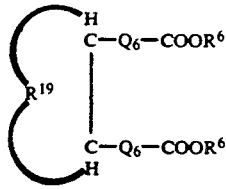

wherein $R^{19}$ represents a divalent saturated hydrocarbon group having 1 to 3 carbon atoms, preferably 2 to 3 carbon atoms, and at least one hetero atom selected from the group consisting of oxygen, nitrogen and sulfur atoms, $Q_6$'s may be identical or different and each represents a direct single bond or a divalent hydrocarbon group having 1 to 6 carbon atoms, preferably 1 to 2 carbon atoms, and $R^6$'s may be identical or different and each represents a linear or branched alkyl group having 1 to 16 carbon atoms, preferably 2 to 8 carbon atoms.

Examples of the divalent saturated hydrocarbon group $R^{19}$ having at least one hetero atom selected from the group consisting of oxygen, nitrogen and sulfur atoms include —M—CH$_2$—, —CH$_2$—M—CH$_2$—, —M—CH$_2$—CH$_2$—, —M—CH$_2$—CH , —CH$_2$—M—CH and —CH$_2$—M—CH$_2$—M—(—M— represents —O—, —NH—, or —S—).

Examples of the divalent hydrocarbon groups $Q_6$ include methylene, ethylene and propylene groups.

Examples of the alkyl group $R_6$ are the same as those given above for $R^1$.

Specific examples of esters of (f) include n-butyl tetrahydrothiophene-2,3-dicarboxylate, n-octyl pyrrolidine-2,3-dicarboxylate and diisobutyl tetrahydropyrane-3,4-dicarboxylate.

More preferred esters are those selected from compounds (a), (b), (d) and (e). Esters selected from the group consisting of compounds (a), (b) and (d) are especially preferred.

In the magnesium-containing solid titanium catalyst component (A) containing magnesium, titanium, a halogen and an electron donor as essential ingredients which is used in the present invention, the electron donor should be selected from the group consisting of the compounds (a), (b), (c), (d), (e) and (f) described above.

The magnesium-containing solid titanium catalyst component (A) contains a magnesium halide having lower crystallinity than commercial magnesium halides. Usually, it has a specific surface area of at least about 3 m$^2$/g, preferably about 40 to about 800 m$^2$/g, more preferably about 80 to about 400 m$^2$/g, and its composition does not substantially change when washed with hexane at room temperature. Preferably, the titanium catalyst component (A) has a halogen/titanium atomic ratio of from about 5 to about 200, especially from about 5 to about 100, an electron donor/titanium mole ratio of from about 0.1 to about 10, especially from about 0.2 to about 6, and a magnesium/titanium atomic ratio of from about 2 to about 100, especially from about 4 to about 50. The component (A) may further contain another electron donor, a metal, an element, a functional group, etc.

The titanium catalyst component (A) can be obtained, for example, by contacting a magnesium compound (or metallic magnesium), an electron donor and a titanium compound with one another. Optionally, other reagents such as compounds of silicon, phosphorus and aluminum may be further used.

Various methods have been known for the production of the magnesium-containing solid titanium catalyst component containing magnesium, titanium, a halogen and an electron donor. For example, such methods are disclosed in Japanese Laid-Open Patent Publications Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 43094/1978, 135102/1980, 135103/1980, 811/1981, 11908/1981, and 18606/1981.

The magnesium-containing solid titanium catalyst component (A) used in this invention may be produced by these known methods except that the electron donor selected from the compounds (a) to (f) is used.

Several embodiments of the production of the catalyst component (A) are shown below.

(1) A magnesium compound or a complex of a magnesium compound with an electron donor, either as such or after having been pulverized in the presence or absence of an electron donor, a pulverization aid, etc., is pre-treated or not pre-treated with an electron donor and/or an organoaluminum compound or a halogen-containing silicon compound and then reacted with a titanium compound which is liquid under the reaction conditions. In the above process, the electron donor selected from (a) to (f) described above is used at least once.

(2) A magnesium compound in the liquid state having no reducing ability is reacted with a liquid titanium compound in the presence of the electron donor selected from the compounds (a) to (f) described above to precipitate a solid titanium complex.

(3) The product obtained by the procedure (2) is reacted with a titanium compound.

(4) The product obtained by the procedure (1) or (2) is reacted with an electron donor or titanium compound.

(5) A magnesium compound or a complex of a magnesium compound with an electron donor is pulverized in the presence of a titanium compound in the presence or absence of an electron donor, a pulverization aid, etc., and with or without pre-treatment with an electron donor and/or an organoaluminum compound or a halogen-containing silicon compound, the resulting solid is treated with a halogen, a halogen-containing compound, or an aromatic hydrocarbon. In the above procedure, the electron donor selected from the compounds (a) to (f) described above is used at least once.

(6) Each of the titanium-containing compounds obtained in (1) to (4) is treated with a halogen or a halogen compound.

Preferred preparation procedures are those in which a titanium halide in the liquid state is used, and those in which a halogenated hydrocarbon is used after or during the use of a titanium compound.

In preparing the magnesium-containing solid titanium catalyst component containing magnesium, titanium, a halogen and an electron donor selected from the group consisting of the esters (a), (b), (c), (d), (e) and (f) in accordance with the aforesaid embodiments, these esters need not always to be used as such. Instead, compounds convertible to such esters, such as acid halides or acid anhydrides, may be used and converted to these esters in situ. These esters may also be used in the form of an adduct or complex with other compounds such as aluminum compounds, phosphorus compounds and amine compounds.

Both magnesium compounds having reducing ability and magnesium compounds having no reducing ability can be used as the magnesium compound for use in the preparation of the magnesium-containing solid titanium catalyst component (A).

Examples of the magnesium compounds having reducing ability include magnesium compounds having a magnesium-carbon bond or a magnesium-hydrogen bond, such as dimethyl magnesium, diethyl magnesium, dipropyl magnesium, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butyl ethoxy magnesium, ethyl butyl magnesium and butyl magnesium hydride. These magnesium compounds may be used, for example, in the form of a complex with organo-aluminum compounds, etc., and may be liquid or solid. On the other hand, examples of the magnesium compounds having no reducing ability include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and magnesium octoxy chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxymagnesiums such as phenoxy magnesium and dimethylphenoxy magnesium; and carboxylic acid salts of magnesium such as magnesium laurate and magnesium stearate. These magnesium compounds having no reducing ability may be those derived from the aforesaid magnesium compounds having reducing ability, or may be those derived during the preparation of the catalyst component. The aforesaid magnesium compounds may be complexes or compounds or mixtures with other metal compounds. Or they may be mixtures with each other. The magnesium compounds having no reducing ability are preferred. Halogen-containing magnesium compounds are especially preferred, and above all, magnesium chloride, alkoxy magnesium chlorides and aryloxy magnesium chlorides are preferred.

Various titanium compounds can be used in preparing the solid titanium catalyst component (A) in this invention. Preferred are tetravalent titanium compounds represented by the formula

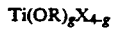

wherein R represents a hydrocarbon group, X represents a halogen atom, and $0 \leq g \leq 4$.

Examples of such titanium compounds include titanium tetrahalides such as $TiCl_4$, $TiBr_4$ and $TiI_4$, alkoxy titanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$, alkoxy titanium dihalides such as $Ti(OCH_3)_2$, $Ti(OC_2H_5)_2Cl_2$, $Ti(O\ n\text{-}C_4H_9)_2Cl_2$ and $Ti(OC_2H_5)_2Br_2$, trialkoxy titanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$, and tetraalkoxy titaniums such as $Ti(OCH_3)_4$, $Ti(OC_2H_5)_4$ and $Ti(O\ n\text{-}C_4H_9)_4$. Of these, halogen-containing titanium compounds are preferred, the titanium tetrahalides being especially preferred. Titanium tetrachloride is by far the most preferred. These titanium compounds may be used singly or as a mixture, or as diluted in a hydrocarbon or a halogenated hydrocarbon.

The amounts of the titanium compound, the magnesium compound and the electron donor to be supported, and other optional electron donors such as alcohols, phenols, monocarboxylic acid esters, silicon compounds and aluminum compounds used in the preparation of the titanium catalyst component (A) cannot be set in a general manner because they differ depending upon the method of preparation. For example, about 0.1 to 10 moles of the electron donor to be supported and about 0.05 to 1000 moles of the titanium compound may be used per mole of the magnesium compound.

In the present invention, olefins are polymerized or copolymerized in the presence of a catalyst composed of (A) the magnesium-containing solid titanium catalyst component containing magnesium, titanium, a halogen and an electron donor selected from the group consisting of the compounds (a) to (f) which can be obtained as above, (B) an organoaluminum compound catalyst component and (C) an organic silicon compound catalyst component having an Si—O—C or Si—N—C bond.

Illustrative of the component (B) are (I) organoaluminum compounds having at least one Al-C bond in the molecule, for example those of the following general formula $$R^1_m Al(OR^2)_n H_p X_q$$

wherein $R^1$ and $R^2$ may be identical or different and each represents a hydrocarbon group, such as a hydrocarbon group having 1 to 15 carbon atoms, preferably 1 to 4 carbon atoms, X represents a halogen atom such as chloro or bromo, m is a number represented by $0 < m \leq 3$, n is a number represented by $0 \leq n < 3$, p is a number represented by $0 \leq p < 3$ and q is a number represented by $0 \leq q < 3$ provided that $m+n+p+q=3$, and (II) complex alkyl compounds of aluminum and metals of Group I of the periodic table which are represented by the general formula $$M^1 Al R^1_4$$

wherein $M^1$ is Li, Na or K, and $R^1$ is as defined above. Examples of the organoaluminum compounds of (I) include compounds of the general formula $$R^1_m Al(OR^2)_{3-m}$$

wherein $R^1$ and $R^2$ are as defined, and m is preferably a number represented by $1.5 \leq m \leq 3$, compounds of the general formula $$R^1_m Al X_{3-m}$$

wherein $R^1$ is as defined above, X represents a halogen atom, and m is preferably a number represented by $0 < m < 3$, compounds of the general formula $$R^1_m Al H_{3-m}$$

wherein $R^1$ is as defined above and m is preferably a number represented by $2 \leq m < 3$, and compounds of the general formula $$R^1_m Al(OR^2)_n X_q$$

wherein $R^1$ and $R^2$ are as defined above, X represents a halogen, $0 < m \leq 3$, $0 \leq n < 3$ and $0 \leq q < 3$ provided that $m+n+q=3$.

Specific examples of the organoaluminum compounds belonging to group (I) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having the average composition $R^1_{2.5} Al(OR^2)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums such as ethyl aluminum dichloride, propyl aluminum dichloride and butyl aluminum dibromide; dialkyl aluminum hydrides such as diethyl aluminum hydride and dibutyl aluminum hydride; partially hydrogenated alkyl aluminums such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Examples of the compounds belonging to group (II) are $LiAl(C_2H_5)_4$ and $LiAl(C_7H_{15})_4$.

Organoaluminum compounds in which two or more aluminums are bonded through an oxygen or nitrogen atom, which are similar to the compounds of group (I), may also be used. Such organoaluminum compounds include, for example, $(C_2H_5)_2AlOAl(C_2H_5)$, $(C_4H_9)_2AlOAl(C_4H_9)_2$ and $$(C_2H_5)_2AlNAl(C_2H_5)_2 \atop | \atop C_2H_5$$

Of these, trialkyl aluminums and alkyl aluminums in which two or more aluminums are bonded are preferred.

The component (C) of the catalyst used in this invention is an organic silicon compound having an Si—O—C or Si—N—C bond, such as alkoxysilanes and aryloxysilanes. Examples of the organic silicon compound are given below.

(i) Organosilanes represented by the following formula $$R_n Si(OR^{20})_{4-n}$$

wherein R represents a hydrocarbon group which may have a halogen atom or an amino group, or a halogen atom, $R^{20}$ represents a hydrocarbon group which may have an alkoxy group, and n is a number represented by $0 \leq n \leq 3$, provided that when 2 to 4 R or ($OR^{20}$) groups exist, they may be identical or different.

In (i) above, examples of the hydrocarbon group R which may have a halogen atom or an amino group include alkyl groups having 1 to 8 carbon atoms, cycloalkyl groups having 4 to 12 carbon atoms, aryl groups having 6 to 12 carbon atoms, alkenyl groups having 2 to 8 carbon atoms, haloalkyl groups having 1 to 8 carbon atoms and aminoalkyl groups having 1 to 8 carbon atoms. Examples of the hydrocarbon group $R^{20}$ which may have an alkoxy group include alkyl groups having 1 to 8 carbon atoms, cycloalkyl groups having 4 to 12 carbon atoms, aryl groups having 6 to 12 carbon atoms, alkenyl groups having 2 to 8 carbon atoms, and alkoxyalkyl groups such as $C_2$-$C_{12}$ alkyl groups having alkoxy groups with 1 to 6 carbon atoms.

Other examples are siloxanes having the group $OR^{20}$ and silyl esters of carboxylic acids. Still other examples include compounds in which two or more silicon atoms are bonded to each other through an oxygen or nitrogen atom.

It is possible to react a silicon compound having no Si—O—C bond with a compound having an O—C bond in advance or at the site of polymerization to form a compound having an Si—O—C bond and use it as the aforesaid organic silicon compound. For example, this can be achieved by a combination of a halogen-containing silane compound having no Si—O—C bond or a silicon halide with an alkoxy group-containing aluminum compound, an alkoxy group-containing magnesium compound, a metal alcoholate, an alcohol, a formate ester, ethylene oxide, etc. The organic silicon compounds may also contain another metal such as aluminum or tin.

(ii) Organic silicon compounds having an Si—N—C bond such as phenyl trisdimethylaminosilane and bis(dimethylamino)diphenylsilane.

Specific examples of the catalyst component (C) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(betamethoxyethoxy)silane, vinyltriacetoxysilane, diethyltetraethoxydisiloxane, and phenyldiethoxydiethylaminosilane.

Preferred are compounds of the above formula $R_nSi(OR^{20})_{4-n}$ such as methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenylmethoxysilane. The component (C) may be used as an adduct with another compound.

In the process of this invention, at least one olefin with or without a diolefin is polymerized or copolymerized in the presence of a catalyst composed of (A) the magnesium-containing solid titanium catalyst component containing magnesium, titanium, a halogen and an electron donor selected from the group consisting of the esters (a), (b), (c), (d), (e) and (f) as essential ingredients, (B) the organoaluminum compound catalyst component and (C) the organic silicon compound catalyst component having an Si—O—C or Si—N—C bond.

The catalyst components (A), (B) and (C) may be contacted during or before the polymerization. Before the polymerization, any two of these may be chosen and contacted and then with the remaining one component. Alternatively, portions of two or three components are first contacted with each other and then with the remainder. Contacting of the individual components before the polymerization may be carried out in an inert gaseous atmosphere or in an olefin atmosphere. Furthermore, after the above contacting before the polymerization, the catalysts component (B) and/or (C) may be partly or wholly removed, and the remainder may be used for the polymerization. When the catalyst component (C) is used at the time of contacting, a fresh supply of the catalyst component (C) may, or may not, be added during the polymerization.

Olefins having 2 to 8 carbon atoms, such as ethylene, propylene, 1-butene, 4-methyl-1-pentene and 1-octene, may, for example, be used in the polymerization. They may be homopolymerized or copolymerized. In the copolymerization process, a polyunsaturated compound such as a conjugated or nonconjugated diene may be selected as a comonomer.

The process of this invention is particularly suitable for the polymerization or copolymerization of alpha-olefins having at least 3 carbon atoms, and can be conveniently applied to the polymerization or copolymerization of at least one olefin containing at least 3 carbon atoms, or the copolymerization of the olefin with up to 10 mole % of ethylene and/or a diolefin.

The polymerization can be carried out either in the liquid or vapor phase. In the case of the liquid-phase polymerization, an inert solvent such as hexane, heptane or kerosene may be used as a reaction solvent, but the olefin itself may be used as a reaction solvent.

The mode of polymerization may be properly chosen, and any of a batchwise method, a semi-continuous method and a continuous method can be used. It is also possible to perform the polymerization in a multiplicity of stages having different reaction conditions.

The amount of the catalyst can be properly selected. Preferably, per liter of the reaction volume (which denotes the volume of a vapor-phase polymerization reaction system in the case of vapor-phase polymerization, and the volume of a reaction liquid medium in the case of liquid-phase polymerization), the amount of the component (A) calculated as titanium atom is, for example, about 0.0001 to about 1 millimole; the amount of the component (B) is such that the proportion of the Al atom in component (B) is, for example, about 1 to about 2,000 moles, preferably about 5 to about 500 moles, per mole of the titanium atom in component (A); and the amount of the component (C) is such that the proportion of the Si atom in component (C) is, for example, about 0.001 to about 10 moles, preferably about 0.01 to about 2 moles, especially preferably about 0.05 to about 1 mole, per mole of the Al atom in component (B).

The polymerization temperature is, for example, about 20 to about 200° C., preferably about 50 to about 180° C., and the polymerization pressure is, for example, from atmospheric pressure to about 100 kg/cm$^2$, preferably about 2 to about 50 kg/cm$^2$.

When the process of this invention is applied to the stereospecific polymerization of alpha-olefins having at least 3 carbon atoms, polymers having a high stereospecific index can be produced with a high catalytic efficiency.

In the polymerization of olefins with previously proposed magnesium-containing solid titanium catalyst components, an attempt to obtain polymers having a high melt index by using hydrogen results in a tendency toward not a small decrease in stereospecificity. The process of the present invention can reduce this tendency. Furthermore, since the catalyst used in this invention has high activity, the amount of polymer yielded per unit weight of the solid titanium catalyst component is larger than in the case of using the conventional catalysts, when polymers having the same stereospecific index are to be obtained. Accordingly, the amount of the catalyst residue, particularly halogen, in the polymer can be reduced. This, of course, enables a catalyst removing operation to be omitted, and the tendency of molds to form rust during the molding operation can be markedly inhibited.

Furthermore, the melt index of the polymer can be changed by using a lesser amount of a molecular weight controlling agent such as hydrogen than in the case of the conventional catalyst systems. It is surprising to note that by increasing the amount of the molecular-weight controlling agent, the activity of the catalyst system rather tends to increase. This characteristic is absent in the conventional catalyst systems. With the conventional catalyst systems, the increasing of the amount of the molecular weight controlling agent for preparation of polymers having a high melt index causes a decrease in the partial pressure of the olefin monomer and necessarily results in a reduction in the activity of the catalyst. The catalyst system of this invention is quite free from these problems, and its activity rather increases.

The conventional catalyst systems decrease in activity with the passage of the polymerization time. This is scarcely observed in the catalyst system of this invention, and the use of the catalyst of this invention leads to a marked increase in the amount of polymers produced in, for example, a multi-stage continuous polymerization process.

Since the catalyst system of this invention is very stable even at high temperatures, no appreciable decrease in stereospecificity is noted even when, for example, propylene is polymerized at 90° C.

The following Examples illustrate the present invention more specifically.

EXAMPLE 1

Preparation of a Solid Catalyst Component (A)

Twenty grams of anhydrous magnesium chloride, 11.9 ml (25 mmoles) of diisodecyl cyclohexene-4,5-dicarboxylate, 3.3 ml of titanium tetrachloride and 3.0 ml of a silicone oil (TSS-451, a tradename for a product of Shin-etsu Chemical Co., Ltd.; 20 cs) as a pulverization aid were fed under a nitrogen atmosphere into a stainless steel (SUS-32) ball mill having an inner volume of 800 ml and an inside diameter of 100 mm and containing 2.8 kg of stainless steel (SUS-32) balls with a diameter of 15 mm, and contacted for 24 hours at an impact acceleration of 7G. Fifteen grams of the resulting co-pulverized product was suspended in 150 ml of 1,2-dichloroethane, and stirred at 80° C. for 2 hours. The solid portion was collected by filtration, and washed thoroughly with purified hexane until no free 1,2-dichloroethane was detected in the washings. The washed solid was dried to form a catalyst component (A) which contained 1.7% by weight of titanium atom, 54% by weight of chlorine atom and 18% by weight of magnesium atom.

Polymerization of Propylene

A 2-liter autoclave was charged with 750 ml of purified hexane, and under a propylene atmosphere at room temperature, 2.51 mmoles of triethyl aluminum, 0.25 mmole of diphenyldimethoxysilane and 0.015 mmole, as titanium atom, of the catalyst component (A) were fed into the autoclave. Hydrogen (200 ml) was introduced, and the temperature was raised to 70° C. Propylene was polymerized for 4 hours. During the polymerization, the pressure of the inside of the autoclave was maintained at 7 kg/cm$^2$G.

After the polymerization, the slurry containing the resulting polymer was filtered to separate it into a white powdery polymer and a liquid phase. After drying, the amount of the white powdery polymer obtained was 278.6 g. It had a boiling n-heptane extraction residue of 97.5%, a melt index of 2.0 and an apparent density of 0.40 g/ml. Concentrating the liquid phase gave 2.9 g of a solvent-soluble polymer. Hence, the activity was 18,800 g-PP/mmole-Ti, and the total isotacticity (II) was 96.6%.

EXAMPLES 2 to 10

Preparation of a Solid Catalyst Component (A)

In each run, a solid catalyst component (A) was prepared in the same way as in Example 1 except that each of the compounds shown in Table 1 was used in the indicated amount instead of 11.9 ml (25 mmoles) of diisodecyl cyclohexene-4,5-dicarboxylate used in Example 1.

The composition of each catalyst is shown in Table 1.

Polymerization of Propylene

Using the catalyst component (A) obtained above, propylene was polymerized in the same way as in Example 1. The results are shown in Table 1.

EXAMPLE 11

Preparation of a Solid Catalyst Component (A)

Twenty grams of anhydrous magnesium chloride, 11.9 ml (25 mmoles) of di-iso-decyl cyclohexene-4,5-dicarboxylate and 3.0 ml of a silicone oil (TSS-451, a tradename for a product of Shin-etsu Chemical Co., Ltd.; 20 cs) as a pulverization aid were fed under a nitrogen atmosphere into a stainless steel (SUS-32) ball mill having an inner volume of 800 ml and an inside diameter of 100 mm and containing 2.8 kg of stainless steel (SUS-32) ball mills with a diameter of 15 mm, and contacted for 24 hours at an impact acceleration of 7G. Fifteen grams of the resulting co-pulverized product was suspended in 150 ml of titanium tetrachloride, and stirred at 80° C. for 2 hours. The solid portion was collected by filtration, and thoroughly washed with purified hexane until no free titanium compound was detected in the washings. The washed solid was then dried to give a catalyst component (A) containing 2.9% by weight of titanium atom, 56% by weight of chlorine atom and 18% by weight of magnesium atom.

Polymerization of Propylene

Using the catalyst component (A) prepared above, propylene was polymerized in the same way as in Example 1.

EXAMPLE 12

Preparation of a Solid Catalyst Component (A)

A solid catalyst component (A) was prepared in the same way as in Example 1 except that 10.3 ml (25 mmoles) of di-n-octyl cyclohexene-4,5-dicarboxylate was used instead of 11.9 ml (25 mmoles) of di-iso-decyl cyclohexene-4,5-dicarboxylate. The composition of the resulting catalyst is shown in Table 1.

Polymerization of Propylene

Using the solid catalyst component (A) prepared above, propylene was polymerized in the same way as in Example 1. The results are shown in Table 1.

EXAMPLE 13

A 2-liter high-speed stirring apparatus (a product of Tokushu Kika Kogyo K.K.) was fully purged with N$_2$ gas, and charged with 700 ml of purified kerosene, 10 g of commercially available MgCl$_2$, 24.2 g of ethanol and 3 g of sorbitan distearate (Emasol 320, a tradename for a product of Kao-Atlas Co., Ltd.). With stirring, the temperature of the system was raised, and the mixture was stirred at 120° C. and 800 rpm for 30 minutes. With high-speed stirring, the resulting suspension under high speed stirring was transferred by means of a Teflon tube having an inside diameter of 5 mm into a 2-liter glass flask (equipped with a stirrer) in which 1 liter of purified kerosene cooled at −10° C. had been put. The resulting solid was collected by filtration, and washed fully with hexane to obtain a carrier.

The resulting carrier (7.5 g) was suspended in 150 ml of titanium tetrachloride, and then 3.3 ml of di-n-octyl cyclohexene-4,5-dicarboxylate was added. The mixture was stirred at 120° C. The solid portion was collected by filtration and again suspended in 150 ml of titanium tetrachloride, and the suspension was stirred at 130° C. for 2 hours. The solid reaction product was collected by filtration from the reaction mixture, and washed with a sufficient amount of purified hexane to give a solid catalyst component (A) containing 2.8% by weight of titanium atom, 60.0% by weight of chlorine atom and 19.0% by weight of magnesium atom.

Polymerization of Propylene

Using the solid catalyst component (A) prepared above, propylene was polymerized in the same way as in Example 1. The results are shown in Table 1.

TABLE 1

| | | Catalyst | | | | Result of the polymerization | | | |
|---|---|---|---|---|---|---|---|---|---|
| | | Amount added | Catalyst composition (wt. %) | | | Activity (g-PP/ mmole- | Total II | Melt flow rate (g/10 | Apparent bulk density |
| Example | Electron donor | (mmoles) | Ti | Cl | Mg | Ti) | (%) | min.) | (g/ml) |
| 2 | Di-n-octyl cyclohexene-4,5-dicarboxylate | 25 | 1.8 | 53 | 17 | 14,700 | 95.1 | 4.3 | 0.38 |
| 3 | D-2-ethylhexyl cyclo-hexene-4,5-dicarboxylate | 30 | 1.9 | 52 | 16 | 13,900 | 94.6 | 9.0 | 0.39 |
| 4 | Diethyl furane-3,4-dicarboxylate | 30 | 1.9 | 59 | 16 | 7,900 | 93.7 | 11.0 | 0.34 |
| 5 | Di-n-butyl cyclohexene-1,2-dicarboxylate | 30 | 1.9 | 58 | 17 | 13,300 | 94.4 | 7.3 | 0.38 |
| 6 | Diethyl cyclohexene-1,2-dicarboxylate | 30 | 2.1 | 54 | 19 | 13,900 | 92.9 | 6.4 | 0.37 |
| 7 | Dibutyl | 30 | 1.8 | 54 | 16 | 16,200 | 93.1 | 5.5 | 0.37 |
| 8 | Di-iso-butylpyridine-2,3-dicarboxylate | 30 | 2.4 | 59 | 16 | 6,900 | 91.2 | 6.3 | 0.34 |
| 9 | Di-2-ethylhexyl indane-2,3-dicarboxylate | 30 | 2.9 | 61 | 20 | 7,100 | 90.6 | 10.5 | 0.30 |
| 10 | Di-n-octyl pyrrolidine-2,3-dicarboxylate | 30 | 1.9 | 58 | 17 | 6,200 | 92.1 | 5.5 | 0.33 |
| 11 | Di-iso-decyl cyclo-hexene-4,5-dicarboxylate | 25 | 2.9 | 56 | 18 | 16,800 | 92.4 | 3.8 | 0.36 |
| 12 | Di-n-octyl cyclohexene-4,5-dicarboxylate | 25 | 2.4 | 59 | 20 | 15,000 | 94.2 | 5.8 | 0.37 |
| 13 | Di-n-octyl cyclohexene-4,5-dicarboxylate | 8 | 2.8 | 60 | 19 | 19,300 | 95.1 | 1.9 | 0.39 |

What is claimed is:

1. In a process for producing a polymer or copolymer of an olefin which comprises polymerizing or copolymerizing at least one olefin with or without a diolefin in the presence of a catalyst comprising (A) a magnesium-containing solid titanium catalyst component containing magnesium, titanium, a halogen and an electron donor as essential ingredients and (B) an organoaluminum compound catalyst component; the improvement wherein
   (1) said catalyst further comprises (C) an organic silicon compound catalyst component having an Si—o—c or Si—N—c bond, and
   (2) said electron donor in the catalyst component (A) is selected from the group consisting of (b), (c) and (f) below:
   (b) a diester of an unsaturated heterocyclic polycarboxylic acid in which the heterocyclic ring is an unsaturated heterocyclic ring composed of at least one pair of two adjacent carbon atoms forming a double bond and an oxygen atom along as a hetero atom with at least two carboxyl groups being directly or indirectly bonded to the carbon atoms forming the double bond, said diester being a compound of the following formula

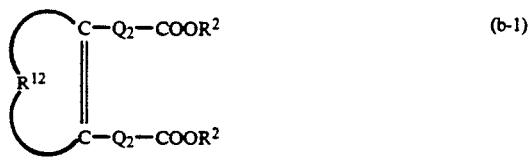

wherein $R^{12}$ represents a substituted or unsubstituted $C_1$–$C_5$ divalent hydrocarbon group having at least one oxygen atom alone as a hetero atom which may have a double bond, $Q_2$'s may be identical or different and each represents a direct single bond or a substituted or unsubstituted divalent hydrocarbon group having 1 to 6 carbon atoms which may have a double bond, $Q_2$'s should not simultaneously contain a double bond, and $R^2$'s may be identical or different and each represents a linear alkyl group having 1 to 16 carbon atoms, provided that at least one of the two $R^2$'s is a linear alkyl group having not less than 2 carbon atoms, (c) a diester of an unsaturated heterocyclic polycarboxylic acid of the following formula

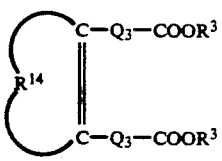

wherein $R^{14}$ represents a substituted or unsubstituted $C_1$–$C_6$ divalent hydrocarbon group which has at least one hetero atom selected from the group consisting of nitrogen and sulfur atoms and which may have a double bond, $Q_3$'s may be identical or different and each represents a direct single bond or a substituted or unsubstituted $C_1$–$C_6$ divalent hydrocarbon group which may have a double bond, $Q_3$'s do not simultaneously contain a double bond, $R^3$'s may be identical or different and each represents a linear or branched alkyl group having 1 to 16 carbon atoms, and at least one of the two $R^3$'s is a linear or branched alkyl group having not less than 3 carbon atoms, and (f) a mono- or poly-ester of a saturated heterocyclic polycarboxylic acid in which $R^6$ of the ester moiety —COOR$^6$ is a hydrocarbon group, and the saturated heterocyclic ring is a saturated heterocyclic ring composed of at least two adjacent carbon atoms and at least one hetero atom selected from the group consisting of oxygen, nitrogen and sulfur atoms with at least two carboxyl group being bonded directly or indirectly to two adjacent carbon atoms of the heterocyclic ring.

2. The process of claim 1 wherein the organic silicon compound catalyst component (C) is an organosilane represented by the following formula

$$R_nSi(OR^{20})_{4-n}$$

wherein R represents a hydrocarbon group which may have a halogen atoms or an amino group, or a halogen atom, $R^{20}$ represents a hydrocarbon group which may have an alkoxy group, and n is a number represented by $0 \leq n \leq 3$, provided that when 2 to 4 R or (OR$^{20}$) groups exist, they may be identical or different.

3. The process of claim 1 wherein the electron donor in the catalyst component (A) is

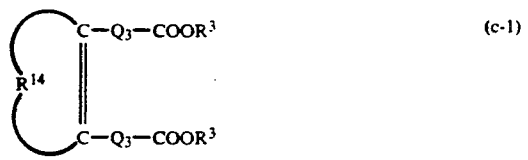

a diester of a saturated heterocyclic polycarboxylic acid of the following formula

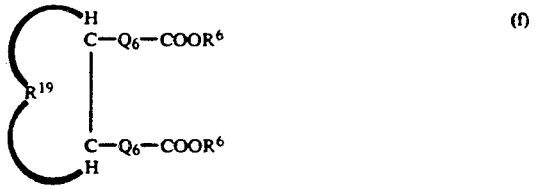

wherein $R^{19}$ represents a divalent saturated hydrocarbon group having 1 to 3 carbon atoms and at least one heteroatom selected from the group consisting of oxygen, nitrogen and sulfur atoms, $Q_6$'s may be identical or different and each represents a direct single bond or a divalent hydrocarbon group having 1 to 6 carbon atoms, and $R^6$'s may be identical or different and each represents a linear or branched alkyl group having 1 to 16 carbon atoms.

4. The process of claim 1 wherein the polymerization or copolymerization is carried out under such conditions that per liter of the reaction volume, the amount of the solid titanium catalyst component (A) is about 0.0001 to about 1 millimoles as the Ti atom; the amount of the organoaluminum compound (B) is such that the proportion of the Al atom in component (B) is about 1 to about 2,000 moles per mole of Ti atom in component (A); and the amount of the organic silicon compound (C) is such that the proportion of the Si atom in component (C) is about 0.001 to about 10 moles per mole of the Al atom in component (B).

5. The process of claim 1 wherein the polymerization or copolymerization is carried out at a temperature of about 20 to about 200° C. and a pressure of from atmospheric pressure to about 100 kg/cm$^2$.

6. The process of claim 1 wherein the organoaluminum compound catalyst component (B) is a compound selected from the group consisting of compounds represented by the general formula

$$R^1{}_mAl(OR^2)_nH_pX_q$$

wherein $R^1$ and $R^2$ may be identical or different and each represents a hydrocarbon group, X represents a halogen atom, m is a number represented by $0 < m \leq 3$, n is a number represented by $0 \leq q < 3$ and q is a number represented by $0q \leq 3$ provided that $m+n+p+q=3$, and compounds represented by the general formula

$$M^1AlR^1{}_4$$

wherein $M^1$ is an atom selected from the group consisting of Li, Na and K, and $R^1$ is as defined above.

7. The process of claim 2 wherein in the formula for the organosilane R is selected from the group consisting of alkyl groups having 1 to 8 carbon atoms, cycloalkyl groups having 4 to 12 carbon atoms, aryl groups having 6 to 12 carbon atoms, alkenyl groups having 2 to 8 carbon atoms, haloalkyl groups having 1 to 8 carbon atoms and amino alkyl groups having 1 to 8 carbon atoms, or a halogen atom, $R^{20}$ represents a hydrocarbon group which may have an alkoxy group and is selected from the group consisting of alkyl groups having 1 to 8 carbon atoms, cycloalkyl groups having 4 to 12 carbon atoms, aryl groups having 6 to 12 carbon atoms, alkenyl groups having 2 to 8 carbon atoms, and alkoxy alkyl groups having 2 to 12 carbon atoms in the alkyl groups and 1 to 6 carbon atoms in the alkoxy groups, and n is a number represented by $0 \leq n \leq 3$, provided that when 2 to 4 R or (OR$^{20}$) groups exist, they may be identical or different.

8. The process of claim 1 for the polymerization or copolymerization of an alpha-olefin having at least 3 carbon atoms or the copolymerization of said alpha-olefin with up to 10 mole % of ethylene, a diolefin or mixtures thereof.

9. The process of claim 1 wherein the electron donor in the catalyst component (A) is said ester of formula (b-1).

10. The process of claim 9 wherein the electron donor of formula (b-1) is selected from the group consisting of di-n-octyl 4,5-dihydrofurane-2,3-dicarboxylate, di-n-butyl 3,4-dihydro-2H-pyrane-5,6-dicarboxylate and di-n-propyl benzopyrane-3,4-dicarboxylate.

11. The process of claim 3 wherein the electron donor in the catalyst component (A) is the diester of formula (c-1).

12. The process of claim 11 wherein the diester of formula (c-1) is selected from the group consisting of di-iso-butyl pyridine-2,3-dicarboxylate, di-n-hexyl pyridine-3,4-dicarboxylate, di-n-butyl thionaphthene-2,3-dicarboxylate and di-n-propyl indole-2,3-dicarboxylate.

13. The process of claim 3 wherein the electron donor in the catalyst component (A) is the diester of formula (f).

14. The process of claim 13 wherein the diester of formula (f) is selected from the group consisting of n-butyl tetrahydrothiophene-2,3-dicarboxylate, n-octyl pyrrolidine-2,3-dicarboxylate and diisobutyl tetrahydropyrane-3,4-dicarboxylate.

15. A catalyst composition for producing a polymer or copolymer of an olefin, said catalyst comprising (A) a magnesium-containing solid titanium catalyst component containing magnesium, titanium, a halogen and an electron donor, (B) an organoaluminum compound catalyst component, and (C) an organic silicon compound catalyst component having an Si—O—C or Si—N—C bond;

said electron donor in the catalyst component (A) being selected from the group consisting of (b) a diester of an unsaturated heterocyclic polycarboxylic acid in which the heterocyclic ring is an unsaturated heterocyclic ring composed of at least one pair of two adjacent carbon atoms forming a double bond and an oxygen atom alone as a hetero atom with at least two carboxyl groups being directly or indirectly bonded to the carbon atoms forming the double bond, said diester being a compound of the following formula

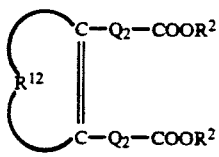

(b-1)

wherein $R^{12}$ represents a substituted or unsubstituted $C_1$–$C_5$ divalent hydrocarbon group having at least one oxygen atom alone as a hetero atom which may ave a double bond, $Q_2$'s may be identical or different and each represents a direct single bond or a substituted or unsubstituted divalent hydrocarbon group having 1 to 6 carbon atoms which may have a double bond, $Q_2+$s do not simultaneously contain a double bond, and $R^2$'s may be identical or different and each represents a linear alkyl group having 1 to 16 carbon atoms, provided that at least one of the two $R^2$'s is a linear alkyl group having not less than 2 carbon atoms, (c) a diester of an unsaturated heterocyclic polycarboxylic acid of the following formula

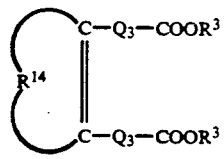

(c-1)

wherein $R^{14}$ represents a substituted or unsubstituted $C_1$–$C_6$ divalent hydrocarbon group which has at least one hetero atom selected from the group consisting of nitrogen and sulfur atoms and which may have a double bond, $Q_3$'s may be identical or different and each represents a direct single bond or a substituted or unsubstituted $C_1$–$C_6$ divalent hydrocarbon group which may have a double bond, $Q_3$'s do not simultaneously contain a double bond $R^3$'s may be identical or different and each represents a linear or branched alkyl group having 1 to 16 carbon atoms, and at least one of the two $R^3$'s is a linear or branched alkyl group having not less than 3 carbon atoms, and (f) a mono- or poly-ester of a saturated heterocyclic polycarboxylic acid in which $R^6$ of the ester moiety —COOR$^6$ is a hydrocarbon group, and the saturated heterocyclic ring is a saturated heterocyclic ring composed of at least two adjacent carbon atoms and at least one hetero atom selected from the group consisting of oxygen, nitrogen and sulfur atoms with at least two carboxyl groups being bonded directly or indirectly to two adjacent carbon atoms of the heterocyclic ring.

* * * * *